United States Patent
Fisher (10) Patent No.: US 9,053,239 B2
(45) Date of Patent: *Jun. 9, 2015

(54) SYSTEMS AND METHODS FOR SYNCHRONIZING SOFTWARE EXECUTION ACROSS DATA PROCESSING SYSTEMS AND PLATFORMS

(71) Applicant: International Business Machines Corporation, Armonk, NY (US)

(72) Inventor: Jeffrey O. Fisher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/844,945

(22) Filed: Mar. 16, 2013

(65) Prior Publication Data

US 2014/0282408 A1    Sep. 18, 2014

Related U.S. Application Data

(63) Continuation of application No. 13/184,461, filed on Jul. 15, 2011, now Pat. No. 8,407,672, which is a continuation of application No. 10/636,985, filed on Aug. 7, 2003, now Pat. No. 7,984,427.

(51) Int. Cl.
   *G06F 9/44*    (2006.01)
   *G06F 11/36*   (2006.01)

(52) U.S. Cl.
   CPC .................. *G06F 11/3688* (2013.01)

(58) Field of Classification Search
   None
   See application file for complete search history.

(56) References Cited

U.S. PATENT DOCUMENTS 4,318,173 A * 3/1982 Freedman et al. ............ 718/103
4,318,182 A    3/1982 Bachman et al.
(Continued)

FOREIGN PATENT DOCUMENTS

EP    0817075 A1    7/1998
JP    05-040721     2/1993
(Continued)

OTHER PUBLICATIONS

Renz, Kai; "An HTTP Interface to Salieri"; paper; MPublishing, University of Michigan Library; Ann Arbor, MI; 1998; pp. 1-4 plus Abstract.

(Continued)

*Primary Examiner* — Chameli Das
(74) *Attorney, Agent, or Firm* — Brevetto Law Group (57) ABSTRACT

Systems and methods for software automation are provided. Software testcases are distributed across multiple data processing systems (equivalently, "machines" or "hosts") that may collectively include multiple platforms (equivalently, "operating systems"). A testcase may be executed as one or more processes progressing through a sequence of phases, with execution within a phase being asynchronous among processes. Synchronization of the testcase processes across the data processing systems and platforms may be effected by managing an event; the testcase processes block on the event upon completion of the current testcase phase. A testcase phase execution service on each host handles synchronization events. The definition of the testcase may include metadata that identifies the particular phases in sequence, that is phase names, for the testcase; the phase names identifies the phases to the synchronization process that triggers the synchronization events which initiate each succeeding phase of the testcase.

14 Claims, 6 Drawing Sheets

(56) References Cited

U.S. PATENT DOCUMENTS

| | | | |
|---|---|---|---|
| 4,323,966 A * | 4/1982 | Whiteside et al. | 714/1 |
| 5,214,780 A | 5/1993 | Ingoglia et al. | |
| 5,504,846 A | 4/1996 | Fisher | |
| 5,511,185 A | 4/1996 | Weinbaum et al. | |
| 5,535,387 A | 7/1996 | Matsuoka et al. | |
| 5,555,419 A | 9/1996 | Arsenault | |
| 5,584,023 A | 12/1996 | Hsu | |
| 5,623,599 A | 4/1997 | Shomler | |
| 5,623,670 A | 4/1997 | Bohannon et al. | |
| 5,812,843 A | 9/1998 | Yamazaki et al. | |
| 5,896,495 A | 4/1999 | Stein et al. | |
| 5,920,733 A | 7/1999 | Rao | |
| 5,946,486 A | 8/1999 | Pekowski | |
| 5,950,011 A | 9/1999 | Albrecht et al. | |
| 5,950,209 A | 9/1999 | Carrier, III et al. | |
| 6,002,869 A | 12/1999 | Hinckley | |
| 6,023,580 A | 2/2000 | Sifter | |
| 6,073,124 A | 6/2000 | Krishnan et al. | |
| 6,079,047 A | 6/2000 | Cotugno et al. | |
| 6,144,969 A | 11/2000 | Inokuchi et al. | |
| 6,157,940 A | 12/2000 | Marullo et al. | |
| 6,185,701 B1 | 2/2001 | Marullo et al. | |
| 6,195,795 B1 | 2/2001 | Block et al. | |
| 6,253,234 B1 | 6/2001 | Hunt et al. | |
| 6,279,109 B1 | 8/2001 | Brundridge | |
| 6,279,124 B1 | 8/2001 | Brouwer et al. | |
| 6,343,371 B1 | 1/2002 | Flanagan et al. | |
| 6,499,116 B1 * | 12/2002 | Roth et al. | 714/39 |
| 6,560,618 B1 | 5/2003 | Ims | |
| 6,594,820 B1 | 7/2003 | Ungar | |
| 6,601,096 B1 | 7/2003 | Lassiter, Jr. | |
| 6,751,711 B1 | 6/2004 | de Buda | |
| 6,754,850 B2 | 6/2004 | Grey et al. | |
| 6,757,847 B1 | 6/2004 | Farkash et al. | |
| 6,775,824 B1 | 8/2004 | Osborne, II et al. | |
| 6,851,075 B2 | 2/2005 | Ur et al. | |
| 6,907,547 B2 | 6/2005 | Shaw et al. | |
| 6,912,550 B2 | 6/2005 | Zhang et al. | |
| 6,959,433 B1 | 10/2005 | Morales, Jr. et al. | |
| 6,971,084 B2 | 11/2005 | Grey et al. | |
| 7,013,462 B2 | 3/2006 | Zara et al. | |
| 7,089,534 B2 | 8/2006 | Hartman et al. | |
| 7,089,556 B2 | 8/2006 | Fong et al. | |
| 7,092,974 B2 | 8/2006 | Thomas et al. | |
| 7,100,039 B2 | 8/2006 | Fisher | |
| 7,107,546 B2 | 9/2006 | Coulthard | |
| 7,159,021 B2 | 1/2007 | Boldman et al. | |
| 7,174,554 B2 | 2/2007 | Pierce et al. | |
| 7,240,072 B2 | 7/2007 | McKnight et al. | |
| 7,346,904 B2 | 3/2008 | Fisher et al. | |
| 7,359,990 B2 | 4/2008 | Munir et al. | |
| 7,458,062 B2 | 11/2008 | Coulthard et al. | |
| 7,617,222 B2 | 11/2009 | Coulthard et al. | |
| 7,721,280 B1 * | 5/2010 | Frisbie et al. | 717/172 |
| 7,984,427 B2 | 7/2011 | Fisher | |
| 8,141,074 B2 | 3/2012 | Fisher et al. | |
| 8,387,075 B1 * | 2/2013 | McCann et al. | 719/328 |
| 2001/0029605 A1 | 10/2001 | Forbes et al. | |
| 2002/0059263 A1 | 5/2002 | Shima et al. | |
| 2002/0122062 A1 | 9/2002 | Melamed et al. | |
| 2002/0124205 A1 | 9/2002 | Grey et al. | |
| 2002/0124241 A1 | 9/2002 | Grey et al. | |
| 2002/0144248 A1 | 10/2002 | Forbes et al. | |
| 2003/0177481 A1 | 9/2003 | Amaru et al. | |
| 2003/0182656 A1 | 9/2003 | Leathers et al. | |
| 2004/0003068 A1 | 1/2004 | Boldman et al. | |
| 2004/0003091 A1 | 1/2004 | Coulthard et al. | |
| 2004/0015831 A1 | 1/2004 | Bowhill | |
| 2004/0060035 A1 | 3/2004 | Ustaris | |
| 2004/0123185 A1 | 6/2004 | Pierce et al. | |
| 2004/0177355 A1 | 9/2004 | Wragge | |
| 2005/0034120 A1 | 2/2005 | Fisher et al. | |
| 2005/0034121 A1 * | 2/2005 | Fisher et al. | 717/175 |
| 2008/0109803 A1 * | 5/2008 | Fisher et al. | 717/175 |
| 2009/0012754 A1 * | 1/2009 | Mosterman et al. | 703/2 |
| 2010/0106949 A1 * | 4/2010 | Komatsu et al. | 712/226 |
| 2011/0040725 A1 * | 2/2011 | Sugimoto | 707/609 |
| 2012/0291013 A1 * | 11/2012 | Fisher | 717/124 |

FOREIGN PATENT DOCUMENTS

| | | |
|---|---|---|
| JP | 04-274535 | 9/1999 |
| JP | 2001-022715 | 1/2001 |

OTHER PUBLICATIONS

Gailly, Jean; "GZIP Home Page"; www.gzip.org (Internet printout); Jun. 2002.

No Author; "Code Page Specification for Both Source and Destination File"; Research Disclosure, Kenneth Mason Publications Ltd., England, No. 319, Nov. 1990, 1 page.

No Author; "Generic Code Page Conversion Application Program Interface"; IBM Technical Disclosure Bulletin, vol. 34, No. 12, May 1992, pp. 421-430.

No Author; "Pre/Post Processor"; IBM Technical Disclosure Bulletin, vol. 37, No. 04A, Apr. 1994, pp. 263-264.

Agesen, Ole et al.; "An Efficient Meta-lock for Implementing Ubiquitous Synchronization"; Proceedings of the 14th ACM SIGPLAN conference on Object-oriented programming, systems, languages, and application (OOPSLA); Mar. 1990; pp. 207-222.

Allen, Gabrielle et al.; Supporting Efficient Execution in Heterogeneous Distributed Computing Environments with Cactus and Globus; Association for Computing Machinery, Denver, CO; Nov. 2001; pp. 1-25.

Callahan, David et al.; "Analysis of Event Synchronization in a Parallel Programming Tool"; In Proceeding of the Second ACM SIGPLAN Symposium on Principles and Practice of Parallel Programming; Mar. 1990; pp. 21-30.

Davis, Helen et al., "Characterizing the Synchronization Behavior of Parallel Programs"; Proceeding of the ACM/SIGPLAN PPEALS; vol. 23, Issue 9; Sep. 1988; pp. 198-211.

Rankin, C.; "The Software Testing Automation Framework"; vol. 41, No. 1; IBM Systems Journal; 2002; pp. 126-139.

U.S. Appl. No. 10/636,985 Office Action; Nov. 17, 2006; pp. 1-21.
U.S. Appl. No. 10/636,985 Office Action; Apr. 9, 2007; pp. 1-28.
U.S. Appl. No. 10/636,988 Office Action; Mar. 2, 2006; pp. 1-12.
U.S. Appl. No. 10/636,988 Office Action; Aug. 10, 2006; pp. 1-22.
U.S. Appl. No. 10/637,067 Office Action; Feb. 23, 2006; pp. 1-5.
U.S. Appl. No. 10/969,950 Office Action; Jun. 14, 2011; pp. 1-8.

* cited by examiner

SYSTEMS AND METHODS FOR SYNCHRONIZING SOFTWARE EXECUTION ACROSS DATA PROCESSING SYSTEMS AND PLATFORMS

CROSS REFERENCE TO RELATED APPLICATIONS

The present invention is related to the following U.S. patent applications which are incorporated herein by reference in their entirety:

Ser. No. 10/637,015 entitled "Systems and Methods for Packaging Files Having Automatic Conversion Across Platforms";

Ser. No. 10/636,988 entitled "Systems and Methods for Building Public Software Packages";

Ser. No. 10/637,067 entitled "Systems and Methods for a Bootstrap Mechanism for Software Testcase Execution"; and Ser. No. 13/184,461 entitled "Systems and Methods for Synchronizing Software Execution Across Data Processing Systems and Platforms".

TECHNICAL FIELD

The present invention relates to the field of software automation in data processing systems, and in particular, to the execution of testcase processes across multiple data processing systems and platforms, and, further, to the synchronization of such processes.

BACKGROUND INFORMATION

Software applications in modern enterprise data processing environments typically constitute many thousands of lines of source code and implement complex functionality. For example, the Apache web server, a widely available, open source web server, comprises at least 80,000 lines of source code. The Linux operating system, exceeds 1.6 million lines of source code. Testing such software products is a time-consuming task. Testing of software involves the invocation of the program functionality, and, typically, validating the correctness of the results of that functionality.

The testing of software includes the execution of one or more testcases which are designed to exercise the operations that implement the functionality of the software under task. The testcases are run to verify that the software under test does not fail for the testcase conditions, and additionally verify that the output generated is correct.

Generally, software testing includes activities that are performed by members of the software development team, and other activities that are automated, that is, performed by another software program.

Data processing systems, particularly in an enterprise environment, typically constitute a networked data processing system in which a set of commonly-accessed resources provide services to a multiplicity of users attached to the network. These services may include electronic mail (e-mail) services, Internet access, distributed computing services, input/output services, such as printing, etc. Moreover, the software deployed to provide such services as well as to access those services may be deployed across a multiplicity of platforms, that is, operating systems. Corresponding thereto, in the testing of a software product, it may be desirable to run testcases across multiple hosts and platforms. For example, in automating the concurrent navigation of multiple graphical user interfaces (GUIs), each GUI may be navigated by a corresponding process.

However, testcases that use more than one testcase process may give rise to race conditions. For example, one testcase process may generate output used by a second testcase process. Thus, the two processes must be synchronized to avoid the second process executing before the first.

Consequently, there is a need in the art for systems and methods to automate the execution of software testcases using multiple testcase processes deployed across multiple hosts and platforms. Additionally, there are needs in the art for such systems and methods which include mechanisms for mitigating against race conditions.

SUMMARY OF THE INVENTION

The aforementioned needs are addressed by the present invention. In one embodiment, a method of executing a distributed application may be performed. The method includes executing a testcase in a sequence of phases. Each phase has a corresponding set of executable code. The code corresponding to each phase is executed asynchronously across multiple processes. The method also includes initiating each phase of the plurality of phases in response to a synchronization event. The synchronization event includes an event triggered and handled externally to the testcase.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Systems and methods for software automation are provided. Software testcases are distributed across multiple data processing systems (equivalently, "machines" or "hosts") that may collectively include multiple platforms (equivalently, "operating systems"). A testcase may be executed as one or more processes progressing through a sequence of phases, with execution within a phase being asynchronous among processes. Synchronization of the testcase processes across the data processing systems and platforms may be effected by managing an event; the testcase processes block on the event upon completion of the current testcase phase. A testcase phase execution service on each host handles synchronization events. The definition of the testcase may include metadata that identifies the particular phases in sequence, that is phase names, for the testcase; the phase names identifies the phases to the synchronization process that triggers the synchronization events which initiate each succeeding phase of the testcase.

In the following description, numerous specific details are set forth to provide a thorough understanding of the present invention. For example, particular interprocess communication (IPC) mechanisms may be referred to, however, it would be recognized by those of ordinary skill in the art that the present invention may be practiced without such specific details, and, in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

Figure 1:
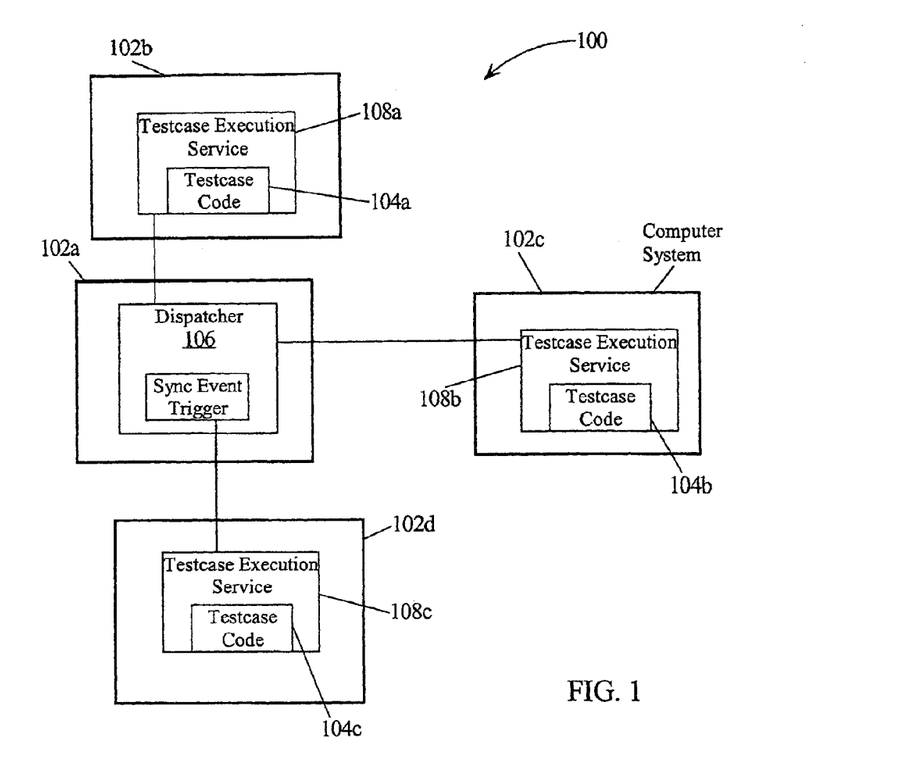
FIG. 1 illustrates an architecture for automating testcase execution in accordance with the present inventive principles.

FIG. 1 schematically illustrates a software automation architecture for executing testcases across multiple data processing hardware and platforms in accordance with the present inventive principles. Architecture 100 includes a plurality of data processing systems 102a-102d which may be conventional workstations, server hardware or similar devices. In accordance with the present inventive principles, data processing systems 102b-102d need not have the same operating system (not shown). (An operating system may also be referred to as a platform.) In other words, a different operating system may be deployed on each of data processing systems 102b-102d, or different combinations of operating systems may be deployed on these data processing systems. Likewise, the operating system deployed on data processing system 102a may thus be different from any of (or the same as) the data processing systems deployed on data processing systems 102b-102d. In this way, the testcases, depicted in FIG. 1 as testcase code 104a-104c, may be executed across different platforms and data processing hardware.

The execution of a testcase across such a multiple host, multiple platform architecture is mediated by dispatcher 106. The operation of dispatcher 106 will be discussed further hereinbelow. In particular, dispatcher 106 may provide synchronization services with respect to execution of the testcase, as discussed in conjunction with FIG. 3 and FIGS. 5A and 5B, below. Additionally, a testcase phase execution service 108a-108c may be included in each of data processing systems 102b-102d. The testcase phase execution service may provide a wrapper around the testcase software itself, and provide an interface between the testcase code and dispatcher 106. In other words, as discussed further hereinbelow, the testcase phase execution service provides a mechanism for synchronization of the execution of the testcase, and an interface between the testcase executable and dispatcher 106.

Figure 2:
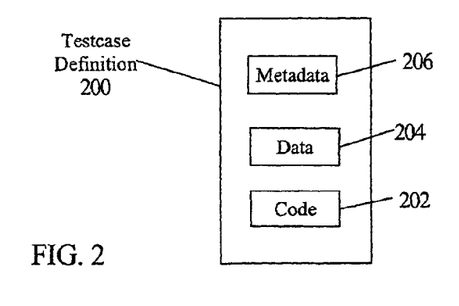
FIG. 2 illustrates, schematically, a testcase definition which may be used in conjunction with the architecture of FIG. 1.

In particular, in accordance with the present inventive principles, a testcase may be executed in phases. In any particular phase, execution may be asynchronous across data processing systems and/or platforms. This may be effected using a testcase definition structure 200 in accordance with the present inventive principles illustrated in FIG. 2. Testcase definition 200 includes code 202 which may include the executable code that perform the operations constituting the test to be performed. Additionally, the testcase definition includes any data, 204 required by the operations constituting the test to be performed. For example, a testcase for a database client/server application may include code for client-side and server-side operations on the database deployed in respective processes. The testcase definition may include data to initialize the database tables. Additionally, in accordance with the present inventive principles, testcase definition 200 includes metadata 206 which constitutes data about the testcase itself. This metadata may include, for example, the names (or other type of identifiers) for each of the phases of the testcase. In other words, a testcase run may be viewed, in accordance with the principles of the present invention, as a sequence of execution phases punctuated by synchronization points. Between the synchronization points, as previously noted, the execution of the testcase across systems and/or platforms may be asynchronous.

This may be further understood by considering FIGS. 3-6 which illustrate, in flowchart form, testcase execution and synchronization processes in accordance with the principles of the present invention. The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available to automate the execution of testcases across data processing systems and/or platforms. It is further noted that the order presented is illustrative and does not necessarily imply that the steps must be performed in the order shown.

Figure 3:
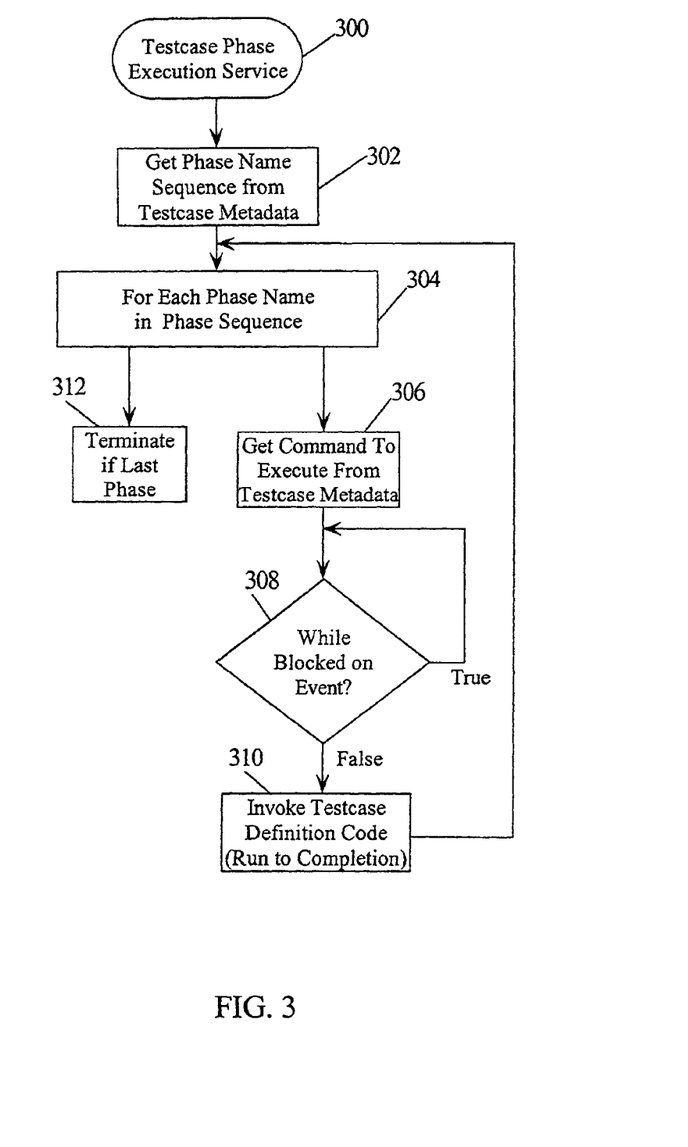
FIG. 3 illustrates, in flowchart form, a testcase phase execution service methodology in accordance with the present inventive principles.

Referring now to FIG. 3, there is illustrated therein a testcase phase execution service process 300 in accordance with the present inventive principles. Testcase phase execution service process 300 may be performed by a testcase phase execution service, such as testcase phase execution service 108a-108c, FIG. 1. Moreover, testcase phase execution service 300 may be invoked by dispatcher 106, FIG. 1. The invocation of test phase execution service 300 may be effected using an interprocess communication (IPC) protocol, or, more particularly, a remote procedure call (RPC) as supported by the particular operating systems deployed on the testcase data processing systems, such as systems 102b-102d, FIG. 1.

Alternatively, remote procedure invocations and interprocess communications may be implemented in an embodiment of the present invention by using high-level process invocation and monitoring services. A mechanism for using such services is provided by the Software Test Automation Framework (STAF). STAF is an open-source, multi-platform framework that provides such services as process invocation, resource management, logging, and monitoring. STAF software and documentation are distributed electronically through SourceForge.net. SourceForge.net is a centralized location for Open Source developers to control and manage Open Source software development. SourceForge.net provides hosting to Open Source software development projects. The Uniform Resource Locator for the STAF homepage at SourceForge.net is <http://staf.sourceforge.net/index.php>. For example, in such an embodiment, the testcase phase execution service may be started using a STAF process service.

Returning to FIG. 3, the phase name sequence is obtained from the testcase definitions metadata, step 302. As discussed in conjunction with FIG. 2, above, the testcase definition metadata may include a list of phase names (i.e. distinct identifiers) for the phases of the particular testcase to be run. The testcase definition may be accessed by testcase phase execution service 300 in response to data provided by a dispatcher, such as dispatcher 106, FIG. 1.

Testcase phase execution service 300 enters a loop over the phases in the sequence in step 304. In step 306, the command to be executed is obtained from the testcase metadata.

In step 308, testcase phase execution service blocks on a phase synchronization event. In this way, the present inventive principles may relieve the testcase itself from having to handle the synchronization of the testcase across testcase processes. Note that a synchronization event may be uniquely associated with each testcase phase. As discussed further below, in an embodiment using STAF, a STAF semaphore service may be used to provide the synchronization event. This will be discussed further in conjunction with FIGS. 5A and 5B. In such an embodiment of the present invention, this may be implemented by associating a corresponding event name with each phase name. (STAF semaphores provide for named event and mutex semaphores.) The use of a STAF semaphore service to post synchronization events will be discussed in conjunction with FIG. 5.

On the triggering of a synchronization event trigger in step 308, testcase phase execution service 300 breaks out of the loop. The testcase definition code is invoked in step 310, and runs to completion. Testcase phase execution service 300 then blocks on the next event by returning to step 304.

On completion of the last phase, testcase phase execution process 300 breaks out of the loop over phases, step 304, and terminates in step 312.

Figure 4:
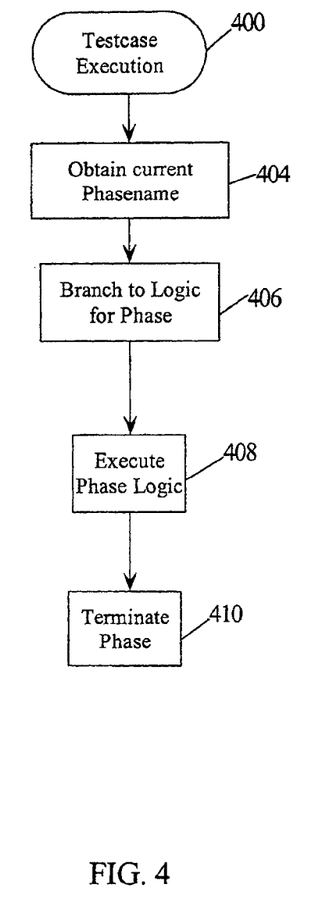
FIG. 4 illustrates, in flowchart form, a testcase code execution methodology in accordance with the principles of the present invention.

Testcase execution may be effected in conjunction with the testcase phase execution service, such as testcase phase execution service 300, FIG. 3 in accordance with testcase execution methodology 400 illustrated, in flow chart form, in FIG. 4. In step 404, the phase name of the current phase is obtained. This may be, for example, extracted from the command line parameters passed through the IPC mechanism. Another mechanism that may be used in an embodiment of the present invention is to pass the phase name in an environment variable. It would be appreciated by those of ordinary skill in the art that the particular technique used to pass in the phase names does not implicate the present inventive principles, and that any of the typically-used parameter-passing mechanisms may be used in conjunction with the present invention. In step 406, the testcase code branches to the logic for the phase having the phase name obtained in step 404. That is, the code may branch to a portion of the executable code corresponding to the current phase. Such a branch may be effected in the testcase code by, for example, a "switch" statement (that is, the branching may be effected by a C-like "switch" statement in the source code; it would be recognized by those of ordinary skill in the art that the executable code corresponds to a set of machine instructions that implement the "switch" statement). (Note that legacy testcases may have been designed to execute asynchronously to completion. It would be appreciated by those of ordinary skill in the art that such testcases are runnable within this invention as a single-phase testcase). This code may represent native machine instructions, virtual machine bytecode, or scripts, depending on the particular development system used to write the testcase. These alternatives do not implicate the present inventive principles, and both fall within the spirit and scope of the present invention. In step 408, the testcase phase code is executed. The testcase execution for the current phase terminates in step 410, and control returns to the testcase phase execution process, such as phase execution process 300, FIG. 3.

Figure 5A:
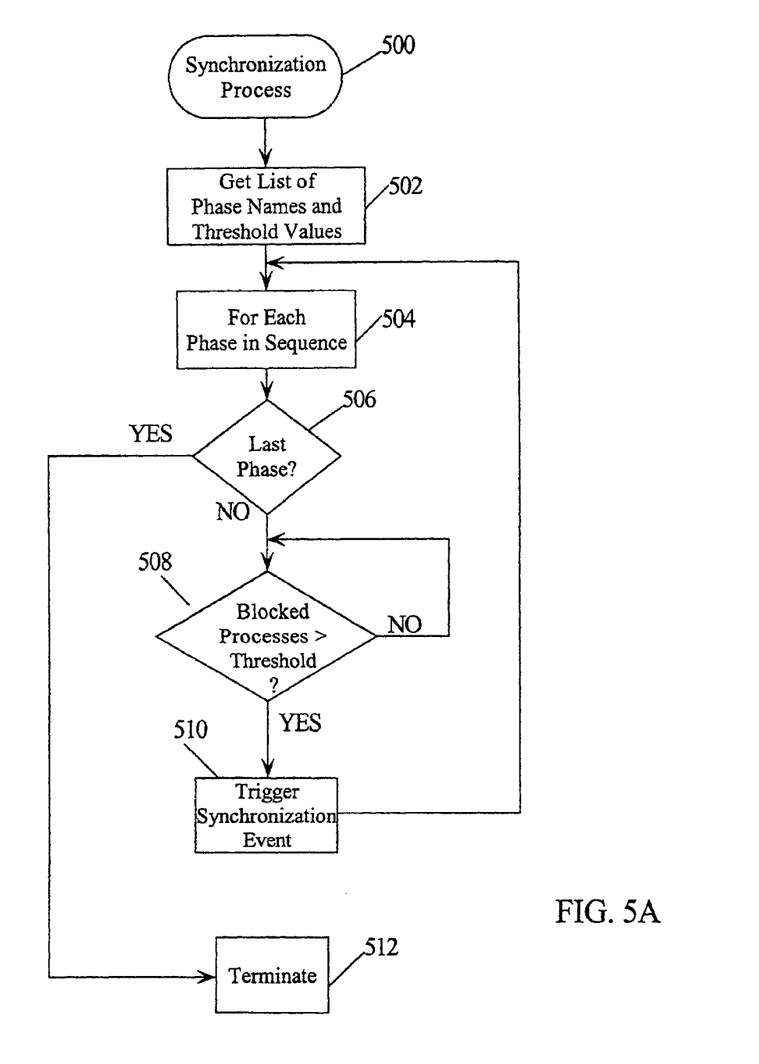
FIGS. 5A and 5B illustrate, in flowchart form, a methodology for synchronizing testcase processes in accordance with the principles of the present invention.
Figure 5B:
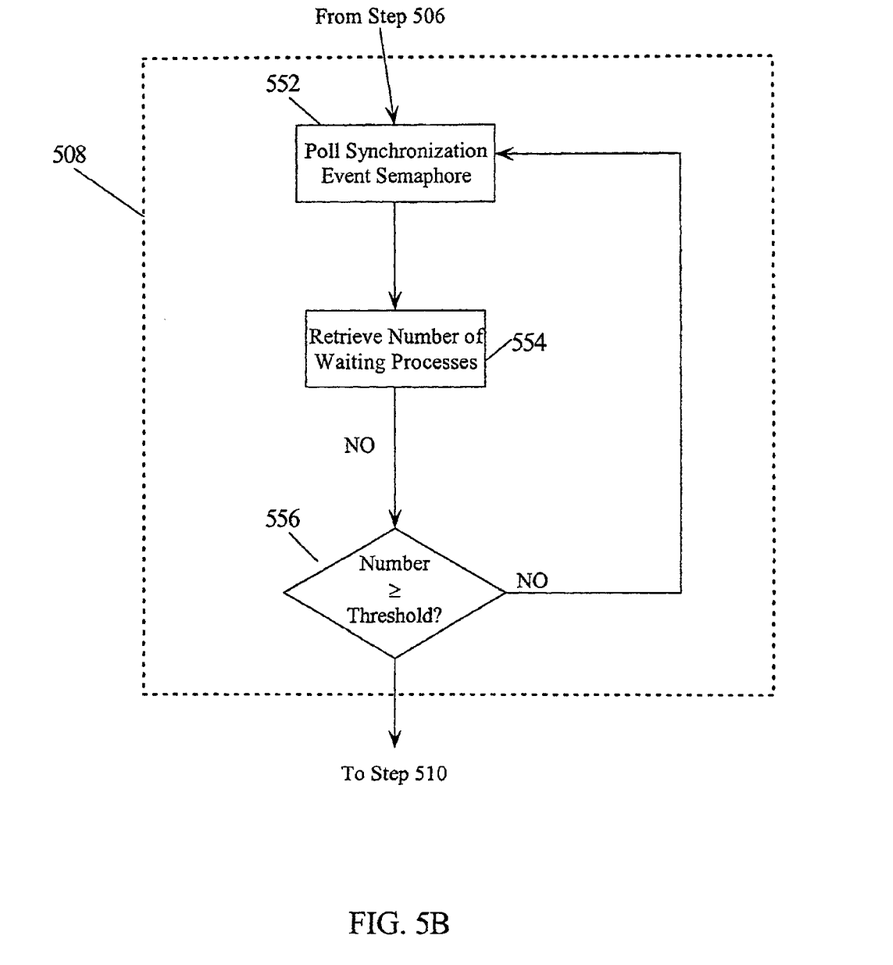

Refer now to FIGS. 5A and 5B illustrating (in partial views), in flow chart form, synchronization process 500 in accordance with the present inventive principles. Recall that synchronization process 500 may be performed by dispatcher 106 in an embodiment according to architecture 100, FIG. 1. However, alternatively, synchronization process 500 may be implemented as a stand-alone process.

In step 502, the phase name sequence is obtained from the testcase definitions metadata, similar to step 302, FIG. 3. Additionally, a threshold value may be obtained from the metadata. In step 504, process 500 enters a loop over the phases for the particular testcase. Recall that the synchronization points are predetermined points in the testcase that punctuate the execution of the testcase to permit the synchronization of the execution across multiple systems and platforms. Typically, a phase is specified by a testcase designer to avoid a potential race condition. However, for the present purposes it suffices that the phases are predetermined by the design of a particular testcase. For each such phase, process 500 continues to step 508, in which a determination is made whether a number of testcase processes blocked on the event associated with the current phase meets or exceeds a preselected threshold. In other words, if the number of testcase processes waiting on the event achieves a "critical mass." The threshold, or "critical mass" value may, for example, be included in the testcase metadata, whereby the triggering of synchronization events on the number of blocked processes may be selected in accordance with the particular testcase.

If the critical mass is achieved, in step 510 the event corresponding to the current phase is triggered. In an alternative embodiment of synchronization process 500, the STAF semaphore service discussed in conjunction with testcase phase service process 300, FIG. 3, may be used. Refer now to FIG. 5B, illustrating alternative steps 508 and 510 in accordance with such an embodiment.

In step 552, the synchronization event semaphore is polled (a STAF event query may be used to effect step 552). The response, in accordance with the STAF specification, includes the number of processes waiting on the event. In step 554, the number of waiting events is retrieved, and in step 556, the number of waiting events is compared to the threshold value. If the number waiting is less than the threshold, step 504 loops back to step 552 ("No" branch of step 554).

If the number of waiting processes meets or exceeds the threshold, in step 510 the synchronization event is triggered. Recall that in this embodiment, an event name may be associated with each phase in the sequence of phases. Thus, in step 510, the named event associated with the current phase is triggered.

Returning to FIG. 5A, process 500 returns to step 504 and loops over the remaining phases in the sequence for the testcase, repeating steps 506-510 until all testcase phases have been executed. On completion of the last phase, synchronization process 500 breaks out of the loop in step 504, and terminates in step 512.

Figure 6:
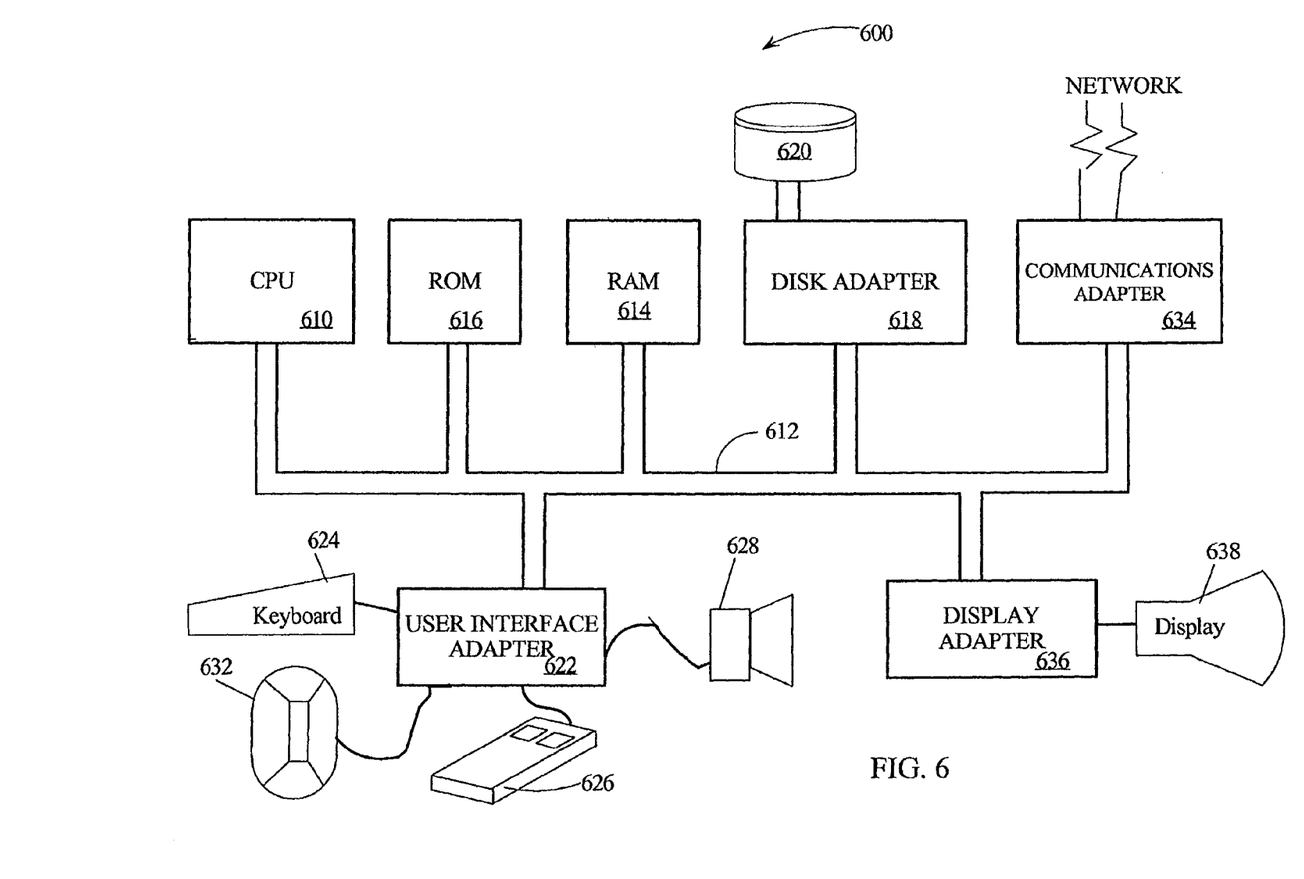
FIG. 6 illustrates, in block diagram form, a data processing system which may be use in conjunction with the methodologies incorporating the present inventive principles.

Referring now to FIG. 6, there is illustrated an exemplary hardware configuration of data processing system 600 in accordance with the subject invention. In one embodiment, this system in conjunction with architecture 100, FIG. 1, including data processing systems 102*a*-102*d* and, correspondingly with the methodologies in FIGS. 3-5 for automated, cross-platform multiprocess software automation. Data processing system 600 includes central processing unit (CPU) 610, such as a conventional microprocessor, and a number of other units interconnected via system bus 612. Data processing system 600 also includes random access memory (RAM) 614, read only memory (ROM) 616 and input/output (I/O) adapter 618 for connecting peripheral devices such as disk units 620 to bus 612, user interface adapter 622 for connecting keyboard 624, mouse 626, trackball 632 and/or other user interface devices such as a touch screen device (not shown) to bus 612. System 600 also includes communication adapter 634 for connecting data processing system 600 to a data processing network, enabling the system to communicate with other systems, and display adapter 636 for connecting bus 612 to display device 638. CPU 610 may include other circuitry not shown herein, which will include circuitry commonly found within a microprocessor, e.g. execution units, bus interface units, arithmetic logic units, etc. CPU 610 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 614 of one or more computer systems configured generally as described above. In one embodiment, these sets of instructions, in conjunction with system components that execute them may effect the execution of testcase phases, as described in conjunction with FIGS. 3 and 4, for example. In another embodiment, these sets of instructions, in conjunction with system components that execute them may effect the synchronization process in accordance with the present inventive principles, as discussed in conjunction with FIG. 5. Until required by the computer system, the set of instructions may be stored as a computer program product in another computer memory, for example, in disk drive 620 (which may include a removable memory such as an optical disk or floppy disk for eventual use in the disk drive 620). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Though the present inventive principles have been described in the context of a multihost, multiplatform testcase correspondingly distributed across a multiplicity of testcase processes, those of ordinary skill in the art would recognize such a testcase as an exemplar of a scaleable, distributed application. It would be further appreciated by those of ordinary skill in the art that any such distributed application may be executed in accordance with the principles of the present invention, and such embodiments would fall within the spirit and scope of the present invention.

Although the present invention and its advantages have been described in detail, it should be understood that various changes, substitutions and alterations can be made herein without departing from the spirit and scope of the invention as defined by the appended claims.

What is claimed is:

1. A method of executing software testing across a plurality of data processing systems respectively executing a plurality of platforms, said plurality of data processing systems being connected by one or more networks, the method comprising:
provide a testcase definition structure that includes a plurality of executable, code testcases each respectively associated with one of the plurality of platforms;
store at least one of the plurality of executable code testcases respectively in non-transitory memory of each of said data processing systems, said plurality of executable code testcases including a first executable code testcase stored on a first data processing system;
select a second phase of the first executable code testcase to be executed next following execution of a first phase on the first data processing system;
determine that there are a number of processes currently being blocked;
determine that said number of processes currently being blocked exceeds a predetermined threshold;
wait while blocking the second phase of the first executable code testcase from executing on the first data processing system; and
provide a synchronization event to eliminate the blocking and initiate execution of the second phase on the first data processing system;
wherein the synchronization event is provided in response to said number of processes currently being blocked exceeding the predetermined threshold.

2. The method of claim 1, wherein the plurality of executable code testcases are respectively provided by a dispatcher to each of the plurality of platforms; and
wherein the synchronization event is provided from a service operating on the first data processing system.

3. The method of claim 1, wherein the synchronization event is a first synchronization event, the method further comprising:
complete execution of the first phase on the first data processing system;
select the second phase of the first executable code testcase to be executed on the first data processing system following completion of the first phase;
wait while blocking the second phase of the first executable code testcase from executing on the first data processing system; and
provide a second synchronization event to eliminate the blocking and initiate execution of the second phase on the first data processing system.

4. The method of claim 1, wherein the testcase definition structure comprises metadata identifiers for each of a plurality of phases of the first executable code testcase; and
wherein the selecting of the phase comprises selecting a metadata identifier of the phase to be executed next on the first data processing system.

5. The method of claim 1, wherein said plurality of platforms comprise at least two different operating systems including an open source operating system.

6. The method of claim 1, wherein said software testing is executed across at least two networks connecting the plurality of data processing systems.

7. The method of claim 6, wherein the number of processes currently being blocked comprises processes on at least two of the plurality of data processing systems.

8. A computer program product for executing software testing across a plurality of data processing systems respectively executing a plurality of platforms, said plurality of data processing systems being connected by one or more networks, the computer program product comprising a non-transitory computer readable storage medium having stored thereon computer readable program code comprising:

computer readable program code for providing a testcase definition structure that includes a plurality of executable code testcases each respectively associated with one of the plurality of platforms;

computer readable program code for storing at least one of the plurality of executable code testcases respectively in non-transitory memory of each of said data processing systems, said plurality of executable code testcases including a first executable code testcase stored on a first data processing system;

computer readable program code for selecting a second phase of the first executable code testcase to be executed next following execution of a first phase on the first data processing system;

computer readable program code for determining that there are a number of processes currently being blocked;

computer readable program code for determining that said number of processes currently being blocked exceeds a predetermined threshold;

computer readable program code for waiting while blocking the second phase of the first executable code testcase from executing on the first data processing system; and computer readable program code for providing a synchronization event to eliminate the blocking and initiate execution of the second phase on the first data processing system;

wherein the synchronization event is provided in response to said number of processes currently being blocked exceeding the predetermined threshold.

9. The computer program product of claim 8, wherein the plurality of executable code testcases are respectively provided by a dispatcher to each of the plurality of platforms; and wherein the synchronization event is provided from a service operating on the first data processing system.

10. The computer program product of claim 8, wherein the synchronization event is a first synchronization event, the actions of the computer program product further comprising:

computer readable program code for completing execution of the first phase on the first data processing system;

computer readable program code for selecting the second phase of the first executable code testcase to be executed on the first data processing system following completion of the first phase;

computer readable program code for waiting while blocking the second phase of the first executable code testcase from executing on the first data processing system; and computer readable program code for providing a second synchronization event to eliminate the blocking and initiate execution of the second phase on the first data processing system.

11. The computer program product of claim 8, wherein the testcase definition structure comprises metadata identifiers for each of a plurality of phases of the first executable code testcase; and wherein the selecting of the phase comprises selecting a metadata identifier of the phase to be executed next on the first data processing system.

12. The computer program product of claim 8, wherein said plurality of platforms comprise at least two different operating systems including an open source operating system.

13. The computer program product of claim 8, wherein said software testing is executed across at least two networks connecting the plurality of data processing systems.

14. The computer program product of claim 13, wherein the number of processes currently being blocked comprises processes on at least two of the plurality of data processing systems.

* * * * *